(12) United States Patent
Husain et al.

(10) Patent No.: US 9,432,810 B2
(45) Date of Patent: Aug. 30, 2016

(54) OPT-IN AND TIME LIMITED BI-DIRECTIONAL REAL-TIME LOCATION SHARING

(71) Applicant: WHOOLEY, INC., Reston, VA (US)

(72) Inventors: Tessa Husain, Great Falls, VA (US); Christina Janczak, Great Falls, VA (US)

(73) Assignee: WHOOLEY, INC., Reston, VA (US)

( * ) Notice: Subject to any disclaimer, the term of this patent is extended or adjusted under 35 U.S.C. 154(b) by 0 days.

(21) Appl. No.: 14/524,409

(22) Filed: Oct. 27, 2014

(65) Prior Publication Data

US 2015/0119080 A1    Apr. 30, 2015

Related U.S. Application Data

(60) Provisional application No. 61/896,972, filed on Oct. 29, 2013.

(51) Int. Cl.
*H04W 4/02* (2009.01)

(52) U.S. Cl.
CPC ..................... *H04W 4/023* (2013.01)

(58) Field of Classification Search
CPC ... H04W 4/023; H04W 64/00; H04W 12/08; H04L 29/08792; H04L 67/28
USPC .......................................... 455/519; 709/217
See application file for complete search history.

(56) References Cited

U.S. PATENT DOCUMENTS

| | | |
|---|---|---|
| 7,305,365 B1 | 12/2007 | Bhela et al. |
| 2002/0169539 A1 | 11/2002 | Menard et al. |
| 2003/0060212 A1 | 3/2003 | Thomas |
| 2005/0113123 A1* | 5/2005 | Torvinen ............... H04W 4/021 455/519 |
| 2006/0046744 A1 | 3/2006 | Dublish et al. |
| 2006/0223518 A1* | 10/2006 | Haney ................... H04W 12/08 455/420 |
| 2009/0187756 A1 | 7/2009 | Nollet et al. |
| 2009/0319172 A1 | 12/2009 | Almeida et al. |
| 2009/0319616 A1 | 12/2009 | Lewis, II et al. |
| 2011/0029688 A1 | 2/2011 | Jung et al. |
| 2011/0045843 A1* | 2/2011 | Hu ..................... H04L 29/08792 455/456.1 |
| 2011/0246606 A1* | 10/2011 | Barbeau .................. H04W 4/02 709/217 |
| 2011/0306366 A1 | 12/2011 | Trussel et al. |
| 2012/0008526 A1* | 1/2012 | Borghei ................ H04W 4/021 370/254 |
| 2012/0100875 A1 | 4/2012 | Tysowski |
| 2012/0303743 A1* | 11/2012 | Stonefield ........... H04L 12/1813 709/217 |
| 2013/0117391 A1* | 5/2013 | Aceves ................ G06Q 10/107 709/206 |
| 2014/0329548 A1* | 11/2014 | Tharshanan ............ H04W 4/12 455/457 |

FOREIGN PATENT DOCUMENTS

| | | |
|---|---|---|
| WO | WO 03/107713 | 6/2003 |
| WO | WO 2010/009328 | 7/2009 |

OTHER PUBLICATIONS

International Search Report issued in International Application No. PCT/US2014/50067 dated Nov. 6, 2014.
Written Opinion issued in International Application No. PCT/US2014/50067 dated Nov. 6, 2014.

* cited by examiner

*Primary Examiner* — William Nealon
(74) *Attorney, Agent, or Firm* — DLA Piper LLP US (57) ABSTRACT

An opt-in and time limited bi-directional real-time location sharing (OTLBLS) system and method that enable individual users of the disclosed system to communicate bi-directionally in real-time while also sharing certain information including, for example, locations, messages and metadata.

15 Claims, 9 Drawing Sheets

OPT-IN AND TIME LIMITED BI-DIRECTIONAL REAL-TIME LOCATION SHARING

CROSS-REFERENCE TO RELATED APPLICATION

This application claims priority from U.S. Provisional Application Ser. No. 61/896,972 filed on Oct. 29, 2013, the entirety of which is incorporated herein by reference.

BACKGROUND

The explosion of smartphone use coupled with the advancement of embedded GPS services has created new opportunities to expand social connectivity and interaction. Mobile phone users are very conscious, and often reluctant, about allowing others to know where they are at any given time. Because of this, many users have not adopted tools that allow real-time location sharing.

Accordingly, there is a need and desire for satisfactory real-time location sharing of a user's mobile device.

DETAILED DESCRIPTION

The disclosed principles and embodiments provide an opt-in and time limited bi-directional real-time location sharing (OTLBLS) system and method that enable individual users of the disclosed system to communicate bi-directionally in real-time while also sharing certain information including, for example, locations, messages and metadata. As used herein, an OTLBLS bi-directional connection is called a "Hoot." The bi-directional connection preferably allows each party to the connection to see the location of all other parties to this connection. It is believed that the reciprocal nature of the location sharing is an important factor in overcoming the aforementioned reluctance of mobile phone users to share their location. It should be noted that groups can be defined on the system disclosed herein or on other systems, including social networking sites such as e.g., Facebook. It should be further noted that, under some circumstances, members of a group can be anonymous to each other; for example, a group defined on an external system associated with a charitable organization, such as a group of participants in a "walk" to raise money.

Figure 1:
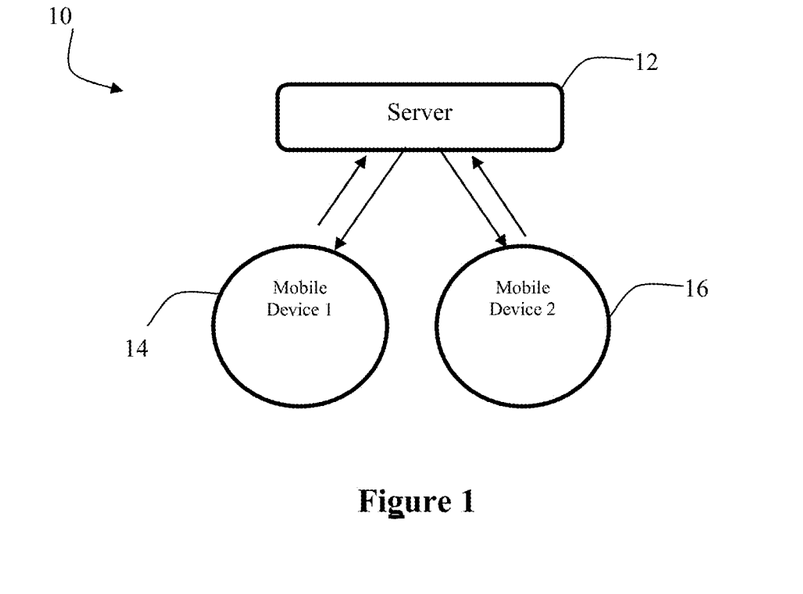
FIG. 1 illustrates an example system according to an embodiment disclosed herein.

FIG. 1 illustrates an example system 10 according to an embodiment disclosed herein. According to this example embodiment, the system 10 includes a central server 12 and two mobile devices 14, 16. The mobile devices 14, 16 may have an application program stored thereon, which is executed to communicate with the server 12 and perform the processes of the method disclosed herein. This application program is referred to herein as the "Whooley application." If the mobile device is a laptop, then the Whooley application may be implemented by a computer program running on the laptop. Alternatively, or in addition to, the mobile devices 14, 16 may access a program running on the server 12, by a website or other mechanism, to perform some or all of the processes of the method disclosed herein. It should be appreciated that the system 10 could include more than two mobile devices and that the principles disclosed herein are not to be limited to use with two mobile devices. As used herein, a "server" should be understood to include a single computer or processing system, or an interconnected group of computers or processing systems that function together to provide the functionality described herein. The servers themselves may provide storage for the information described herein, or may be connected to external storage systems that store this information. The mobile/user devices may include mobile phones, laptops, netbooks, or any other commercially available or custom-made processing systems. A wide variety of networks and communications systems may be used alone or in combination to provide for connectivity between the server and the mobile devices described herein, including the Internet, private internets, WANs, LANs, cellular communications systems, and the public switched telephone network.

The mobile devices 14, 16 communicate with each other bi-directionally through the central server 12 using standard communications protocols. The location of the mobile devices 14, 16 is determined using a combination of location services available on the mobile devices 14, 16 including but not limited to an embedded GPS device, cell tower triangulation and geo fence location services. Each mobile device location is transferred to the server 12 and shared with the cooperating mobile devices 14, 16.

Figure 2:
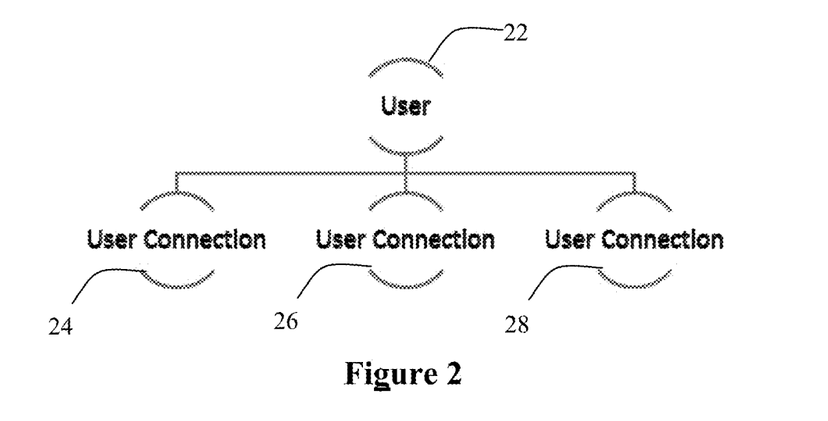
FIG. 2 illustrates possible user-to-user connections in accordance with an example embodiment disclosed herein.

Users of the Whooley application have the ability to request to share locations, messages and meta-data bi-directionally with other users or groups of users within the application. Users can communicate with other users of the application if they are connected with the consent of the user. For example, if user Bill requests to be connected with user Harry, Harry can choose to accept or deny the request. If Harry accepts the request, Bill and Harry become connected within the application. FIG. 2 illustrates an example where a first user 22 has established connections with three other users 24, 26, 28 in accordance with the disclosed principles.

Figure 3:
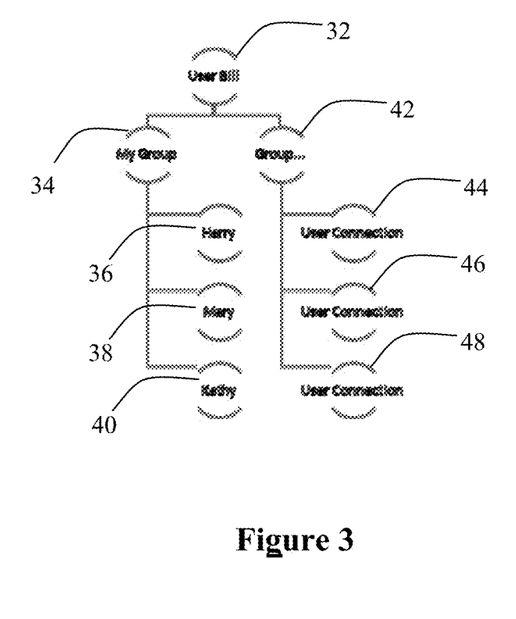
FIG. 3 illustrates possible user group connections in accordance with an example embodiment disclosed herein.

The system and method disclosed herein also supports groups and group connections. Groups are a collections of connections defined within the application. For example, as shown in FIG. 3, if user Bill 32 is connected with users Harry 36, Mary 38 and Kathy 40, Bill 32 can create a group named "My Group" 34 that contains the Bill, Harry, Mary and Kathy connections. FIG. 3 also illustrates another group 42 comprising three other user connections 44, 46, 48 with Bill 32.

Figure 7:
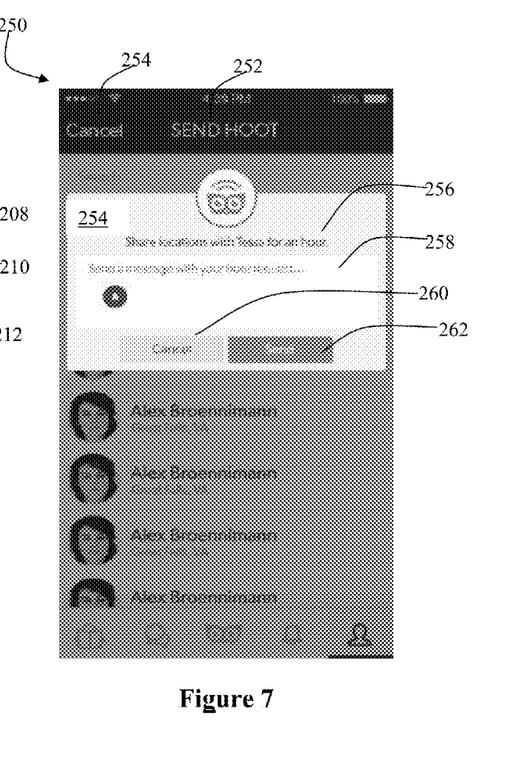
Figures 8, 9:
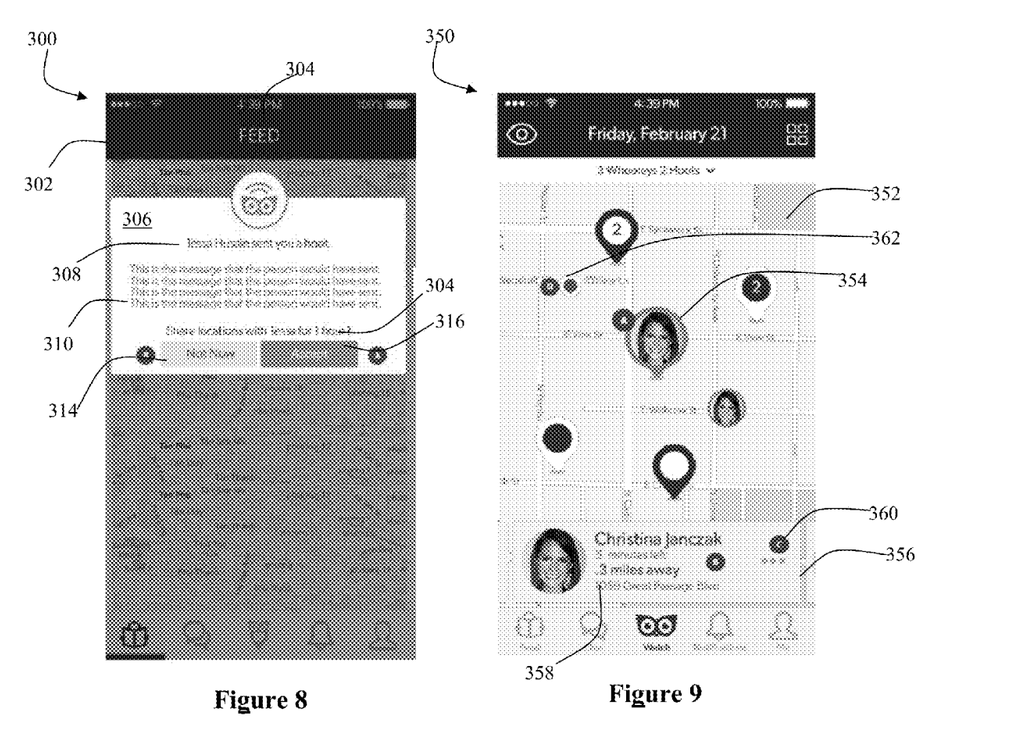

Hoots are initiated when a user requests to share location information bi-directionally with another user or group of users for a duration of time (an example screenshot of a page illustrating a Hoot request with a one hour time limit is shown in FIG. 7, which is discussed below in more detail). The information that is shared includes the users' real-time location, messages and meta-data. The bi-directional location information is represented on a real-time and active map on the users' mobile devices (an example screenshot of a page illustrating example bi-directional location information on a map is shown in FIG. 9, which is discussed below in more detail). As noted above, other information that can be shared over the connection includes messages and meta-data. It should also be appreciated that the location information, messages and meta date being exchanged between the users could be encrypted, if desired, by any known technique.

The receiving user of the Hoot request has the ability to instantly accept the Hoot, postpone the Hoot or reject the Hoot (an example screenshot of a page illustrating a how a user can accept or defer a Hoot request is shown in FIG. 8, which is discussed below in more detail). Once instantiated, a Hoot is deemed Active. Active Hoots can be cancelled by any user at any time. In accordance with one disclosed embodiment, active Hoots will time-out after a predefined period of time. In one embodiment, as discussed herein, the time period is one hour.

Initiating Hoots: As disclosed herein, a device user initiates a Hoot with another user or group of users by its mobile device. The device user can send a message when a Hoot is initiated to provide a more personal reason for the Hoot to the requested user or group of users. The disclosed system and method support multiple active Hoots at any given time.

Established Hoots: Users with active Hoots are presented on a real-time interactive map. Location data is passed directly between the clients not by a URL. The server does not process the location data, the map APIs on the user devices do. Hoot messages can be broadcast to groups of users with active Hoots. As noted above, the disclosed system and method support multiple active Hoots at one time.

Real-time Location Storage, Message Storage and Metadata Storage: Real-time location information of the user who sent the Hoot and all users that accepted the Hoot is shared over the connection and maintained on the server 12. Messages are stored on the server 12 for the duration of the hoot and the user can reference and query the system 10 for any messages during the Hoot connection. In one embodiment, the messages are deleted when the Hoot ends. Alternatively, the messages can be retained for a predetermined amount of time before being deleted. In another alternative, the messages are not deleted. Meta-data about the connection is stored on the server. Statistics about the Hoot and the connection are also stored on the server. This stored information can be permanently retained, retained for the same period of time that messages are retained, or retained for any other desirable period.

Accepting/Rejecting Hoots: If the user receiving the Hoot request chooses to defer the request (e.g., by selecting a "Not Now" option), then the Hoot request can be accepted later, but within a pre-defined or user selected period of time. If the Hoot is not accepted during that time then the Hoot request disappears and the user who sent the Hoot request has to request a new Hoot. If the user accepts the Hoot, the location of that user and each user within a group will appear on a real-time active location map. The maps on each of the users' devices will track the users during the Hoot connection on the real-time and active interactive map. Real-time user information is available on the map and includes the address of the user, directions to the user, the users' current location and the distance the user is from your current location. Since the connections are bi-directional, all of the participating users will have the same information available.

Figure 11:
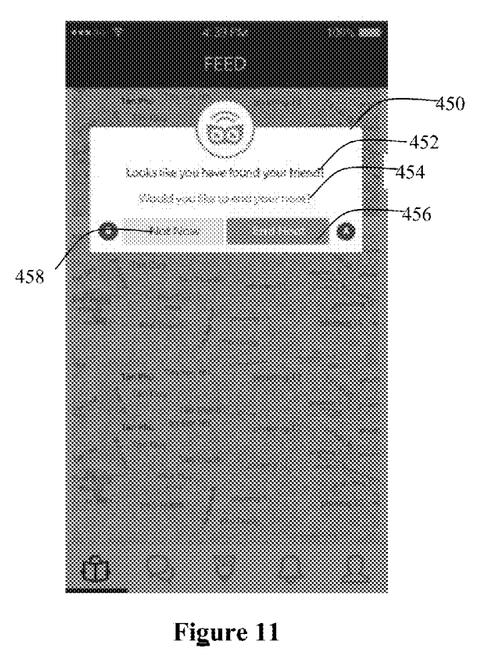

Ending Hoots: In one embodiment, Hoots end after a configured amount of time has elapsed since the Hoot was activated. All users involved in the Hoot are notified that the Hoot is no longer active. Moreover, users can end Hoots on demand at any time. If two users with active Hoots are within a configurable proximity to each other, both users will be notified by a e.g., a prompt displayed on their devices (an example screenshot of a page illustrating a suitable prompt is shown in FIG. 11, which is discussed below in more detail). The prompt may include options for continuing the Hoot, ending the Hoot now, or ending the Hoot after a certain amount of time has elapsed. Alternatively, the hoot could be ended automatically without user input, either automatically and autonomously by the Whooley applications installed on the user devices or in response to a command from the server or from the other user's device. It should be appreciated that ending the hoot automatically saves the battery life of the users' devices.

Several features of the disclosed system, method and application will now be explained with reference to FIGS. 4-17, which illustrate example screenshots of pages displayed on a mobile phone executing the Whooley application. It should be appreciated that the screenshots of the pages and features shown therein are examples only. It should be appreciated that similar types of pages could be displayed on laptops, tablets and the other suitable mobile devices discussed above.

Figure 4:
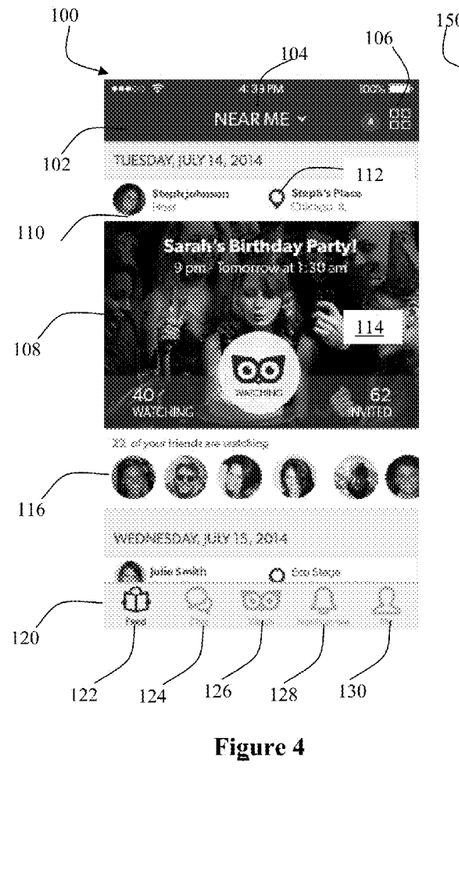
FIGS. 4-17 illustrate various example screenshots of pages displayed on a mobile device operating in accordance with the disclosed principles.
Figure 5:
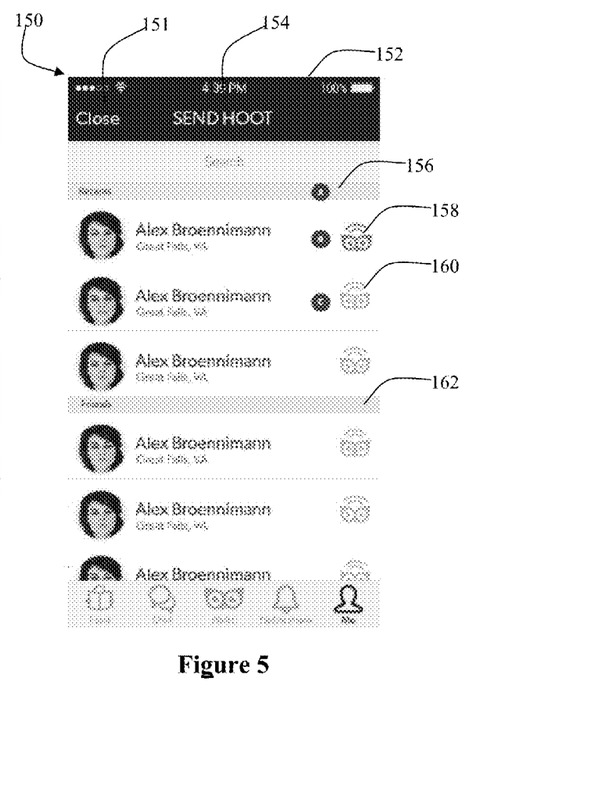

FIG. 4 illustrates a first screenshot of a page 100 that includes an upper portion 102 having the text "Near Me" 104 indicating the type of page 100 (and its displayed information). The upper portion 102 also includes a universal "+" menu selection 106 that allows a user to select from several available actions including a "Send Hoot" option (not shown in FIG. 4). If the "Send Hoot" option is selected, the application would display a "Send Hoot" page on the device. An example screenshot of the "Send Hoot" page 150 is shown in FIG. 5, discussed below. The upper portion 102 could contain other menu options or an option to minimize or close the application, if desired.

Figure 6:
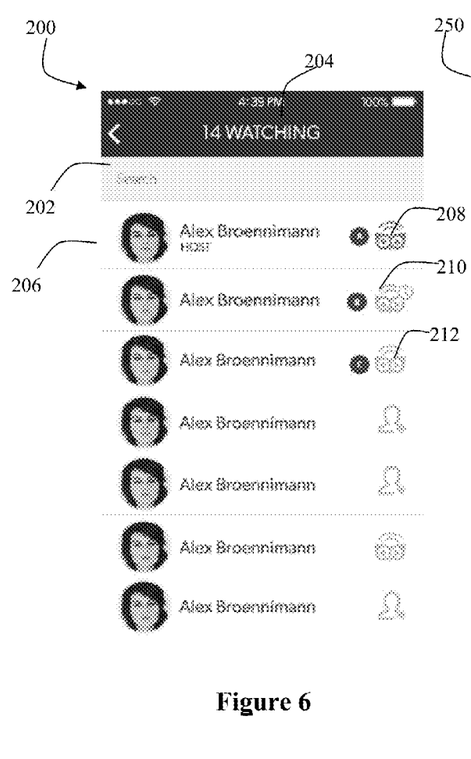

A middle portion 108 of the page 100 includes information and an image (if available) of a host 110 and the host's location 112, information 114 about the host (e.g., a birthday party), and how many users are watching and/or are invited to the party. The graphic displayed with the information 114 is selectable to allow a user to drill down to another page where users are able to send a Hoot to a friend in e.g., a list form. An example screenshot of a page 200 suitable for sending Hoots from a list is shown in FIG. 6, discussed below. The middle portion 108 of the page 100 also includes images (when available) 116 of the device user's friends that are watching the information 114 regarding the birthday party. In one embodiment, users must be friends of the device user according to the Whooley system in order to send them a Hoot.

A bottom portion of the page 100 includes a menu bar 120 that is common to most of the pages described herein. The menu bar 120 includes graphical images and text describing user tab options available from the page 100. In the illustrated example, the menu bar 120 includes a "Feed" tab option 122, "Chat" tab option 124, "Watch" tab option 126, "Notifications" tab option 128, and a "Me" tab option 130. Selecting one of the tab options in the menu bar 120 brings up a page associated with the respective option.

FIG. 5 illustrates an example screenshot of a page 150 that includes an upper portion 152 having the text "Send Hoot" 154 indicating the type of page 150 (and its displayed information). The upper portion 152 also includes a "Close" option 154 for closing the page should the device user desire not to send a Hoot. The page 150 also includes a list 156 of recent Hoots. In one embodiment, this list would display the five most recent users the device user has sent a Hoot to, or had an active Hoot with. As can be seen in the illustrated example, each name on the list includes a location and a graphic 158, 160. The graphic may be used to indicate whether the device user has an active Hoot with a user on the list. For example, the graphic may have a certain color (e.g., orange) or bright shading to represent that the Hoot is currently active, this is shown by graphic 158. In accordance with a preferred embodiment, the graphic 158 representing an active Hoot can be selected to end the Hoot.

In addition, the graphic may have a second color (e.g., grey) or dim shading to represent that the device user does not have an active Hoot with the user on the list, as shown by graphic 160. In accordance with a preferred embodiment, the graphic 160 can be selected to send a Hoot to the user associated with the graphic.

The illustrated page 150 also contains a list 162 of friends associated with the device user that resembles the list 156 of recent Hoots. Similar to list 156, each name on the list 162 of friends includes a location and a graphic. In one embodiment, the graphic in list 162 may have the same color scheme and functions as the graphics used in the list 156 of recent Hoots. It should be appreciated that other features for this page 150 may also be included. For example, the page 150 (or a similar page) may include a listing of favorites or groups of people for sending Hoots to.

FIG. 6 illustrates an example screenshot of a page 200 that can be displayed after the user selected the graphic 114 from page 100. The page 200 includes an upper portion having the text "14 Watching" 204 indicating the type of page 200 (and its displayed information). The page 200 includes a search box 202 to allow the device user to search for other users by entering text into the box 202. The page 200 also includes a list 206 of users that the device user can use to select a user from the list 206 to send a Hoot to the selected user. Each name on the list 206 includes a location and a graphic 208, 210, 212.

The graphic can be used to indicate whether the device user has an active Hoot with a user in the list. For example, the graphic can have a certain color (e.g., orange) or bright shading to represent that the Hoot is currently active, this is shown by graphic 208. In accordance with a preferred embodiment, the graphic 208 representing an active Hoot can be selected to end the Hoot. In addition, the graphic can have a second color (e.g., grey) or dim shading to represent that the device user does not have an active Hoot with the user on the list, as shown by graphic 212. In accordance with a preferred embodiment, the graphic 212 can be selected to send a Hoot to the user associated with that graphic. Moreover, a different graphic can be used, such as graphic 210, to indicate that the device user has already sent a Hoot request to the user on the list, but the request has yet to be accepted. In accordance with a preferred embodiment, the graphic 210 representing a Hoot request that has not yet been accepted can be selected to cancel the Hoot request. It should be appreciated that if users are not friends with the device user according to the Whooley system, a Hoot graphic would not be displayed next to the user.

Figure 13:
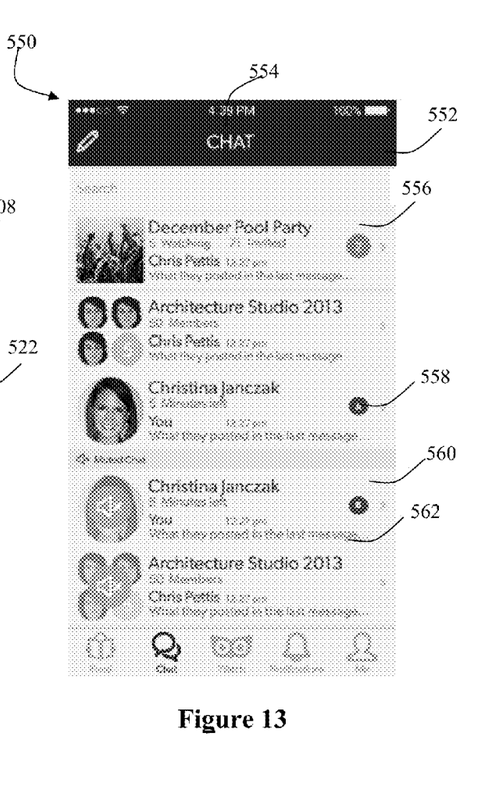

FIG. 7 illustrates an example screenshot of a page 250 that can be displayed after the device user has selected an option to send a Hoot to another user (e.g., after selecting graphic 160 of FIG. 5). The page 250 includes an upper portion 252 having the text "Send Hoot" 254 indicating the type of page 250 (and its displayed information). The upper portion 252 also includes a "Cancel" option 254 to cancel the Hoot request and return the device user to the prior displayed page. The page 250 also includes a dialog box 254 having text 256 identify who the Hoot request is being sent to and how lone the Hoot will last (e.g., "Share locations with Tessa for an hour"). The dialog box 254 includes a portion 258 to allow the device user to enter a message to be sent with the Hoot request, a "Cancel" option 260 to allow the user to cancel the request before it is sent, and a "Send" option 262 to send the request. In one embodiment, the device user can send a 140 character message along with the request. The user receiving the request will receive a push notification outside of the Whooley application, and when the application is opened, will receive a pop-up message such as the one shown in FIG. 8 (discussed below). When a Hoot request is sent, the disclosed system and method automatically initiates a chat between the two users displaying the original message (if applicable). An example of the chat is shown in FIG. 13 (discussed below).

FIG. 8 illustrates an example screenshot of a page 300 that can be displayed when a Hoot request has been received by a user's device. The page 300 includes an upper portion 302 having the text "Feed" 304 indicating the type of page 300 (and its displayed information). The page 300 also includes a dialog box 306 having text 308 stating who sent the Hoot request (e.g., "Tessa Husain sent you a hoot"). The dialog box 306 includes the message 310 from the requesting user, text 312 indicating the length of the Hoot (e.g., "Share locations with Tessa for 1 hour?"), a "Not Now" option 314 to postpone accepting the request, and a "Accept" option 316 to accept the Hoot.

If the receiving user accepts the Hoot request, then both users will be able to see their updating location for the time period noted in the request. Location services will be activated on the users' devices (if not on already) and will update the users locations in the background. It should be appreciated that disclosed system and method are not limited to a one hour time period. Shorter or longer time periods may be used, if desired. In one embodiment, the time period is set by the server 12. Alternatively, or in addition to, the time period may be changed by the device user by a user preference. The Hoot will automatically expire after the time period.

If the receiving user selects the "Not Now" option 314, the request goes into the notifications tab, allowing the receiving user to accept the request within the next 30 minutes. It should be appreciated that disclosed system and method are not limited to a 30 minute time period. Shorter or longer time periods may be used, if desired. If the receiving user does not accept the Hoot request, it will expire. If the receiving user accepts the Hoot request before the 30 minute time period expires, the Hoot will become active and will last for the time period starting from the accepting time.

FIG. 9 illustrates an example screenshot of a page 350 illustrating example bi-directional location information on a map 352. An active Hoot bubble 354 appears on the map in the user's location. Other bubbles representing other active Hoots and/or users connected with the device user may also be displayed on the map 352. Selecting the bubble 354 causes an information card 356 to appear on the page 350. The information card 356 includes the selected user's information with the amount of time left in the Hoot, the distance between the user and the device user (at the time the bubble 354 was pressed), and the address of the user. An action sheet menu selection 360 may be selected to display a list of available actions, such as the list 400 illustrated in FIG. 10. As discussed above, should the device user's location and another user's location come within a certain distance (e.g., 50 meters), both user devices will be sent a push notification and an in-app notification prompting them to end their Hoot. An example of this notification is illustrated in FIG. 11.

Figure 10:
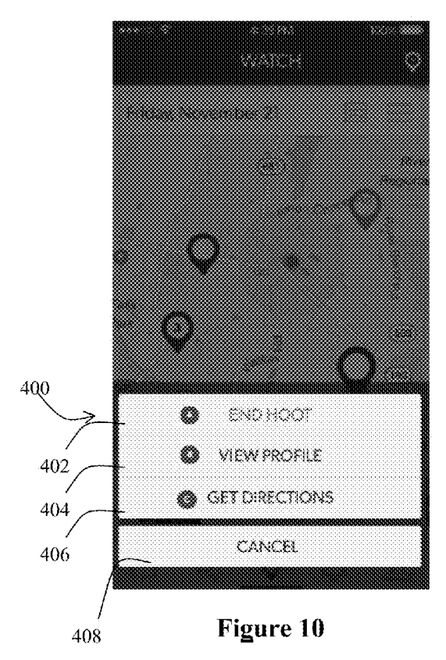

Referring to FIG. 10, the action list 400 can include an "End Hoot" action 402, "View Profile" action 404, "Get Directions" action 406 and a "Cancel" action 408. Selecting the "End Hoot" action 402 causes a notification to be displayed, such as the example notification illustrated in FIG. 17, and if the device user continues with the action, terminates the Hoot and causes a notification that the Hoot has been terminated to be sent to the other user. If the "View Profile" action 404 is selected, the device user is allowed to view the profiles of the other users. If the "Get Directions" action 406 is selected, the device will display directions to the selected user. It should be appreciated that an external application such as e.g., Apple Maps may be used to provide the directions. Selection of the "Cancel" action 408 removes the action list 400 from the display, uncovering the previously displayed page.

FIG. 11 illustrates an example notification 450 that can be generated when the device user's location and another user's location are within a certain distance (e.g., 50 meters) of each other. It should be appreciated that the distance can be greater or less than 50 meters and can be set by the server or, alternatively, by the device user by a user preference. The notification 450 includes text 452 such as e.g., "Looks like you have found your friend!" and a prompt 454 such as e.g., "Would you like to end your hoot?" An "End Hoot" option 456 can be selected to end the Hoot, while a "Not Now" option 458 will keep the Hoot active until it expires or is otherwise cancelled by one of the users. Should the "End Hoot" option 456 be selected, the other user is sent a notification that the Hoot was terminated.

Figure 12:
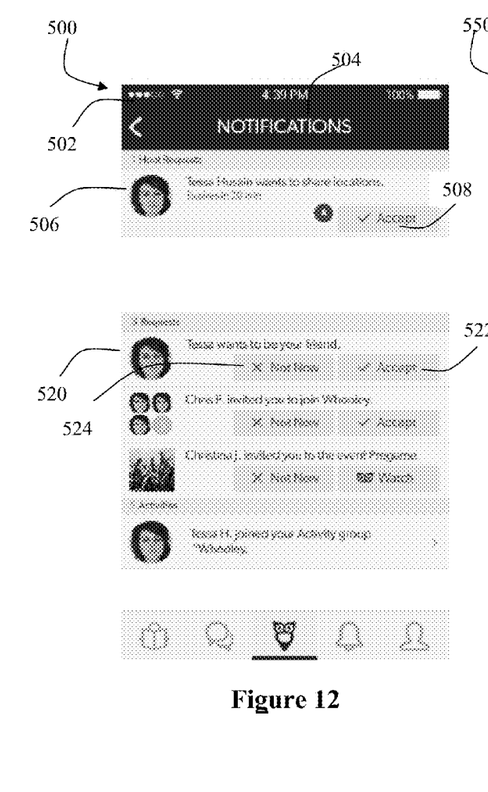

FIG. 12 illustrates an example screenshot of a notifications page 500. The page 500 can be displayed on the user device when the "Notifications" tab option 128 (FIG. 4) is selected. The page 500 includes an upper portion 502 having the text "Notifications" 504 indicating the type of page 500 (and its displayed information). The example page 500 illustrates one Hoot request 506 and an "Accept" button 508 for accepting the Hoot. The device user has 30 minutes to accept the Hoot request after receiving it. If the device user accepts the Hoot, the Hoot remains active until it expires or is terminated by one of the techniques discussed herein. If the Hoot request is not accepted within the 30 minute time period, the request will expire and both users are notified that the request expired. The notification may originate from the server or from the other user's device.

The illustrated page 500 also includes a friend request 520 with options to "Accept" the request ("Accept" option 522) or defer accepting the request ("Not Now" option 524).

FIG. 13 illustrates an example screenshot of a chat page 550. The page 550 can be displayed on the user device when the "Chat" tab option 124 (FIG. 4) is selected. The page 550 includes an upper portion 552 having the text "Chat" 554 indicating the type of page 550 (and its information). The illustrated page 550 includes a list of active chats 556 (established by Hoots) and the last message 558 from each chat. The illustrated page 550 also includes a list of "muted" chats 560 (established by Hoots) and the last message 562 from each chat. In one embodiment, a "muted" chat is one in which the device user does not receive loud push notifications when there are new chats.

Figure 14:
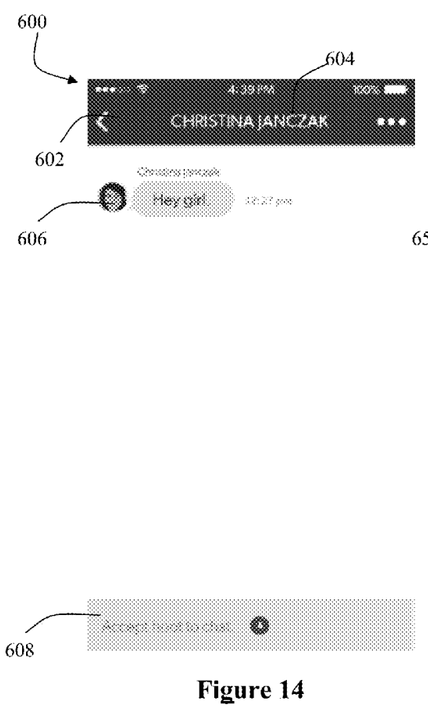

FIG. 14 illustrates an example screenshot of a page 600 that may be displayed when the user's device receives a Hoot request. The page 600 includes an upper portion 602 having text 604 identifying the person requesting the Hoot (e.g., "Christina Janczak"). The example page 600 illustrates the message 606 accompanying the Hoot request (e.g., "Hey girl.") and an "Accept" notification 608, which alerts the user that there is a Hoot to accept (from e.g., the notifications tab).

Figure 15:
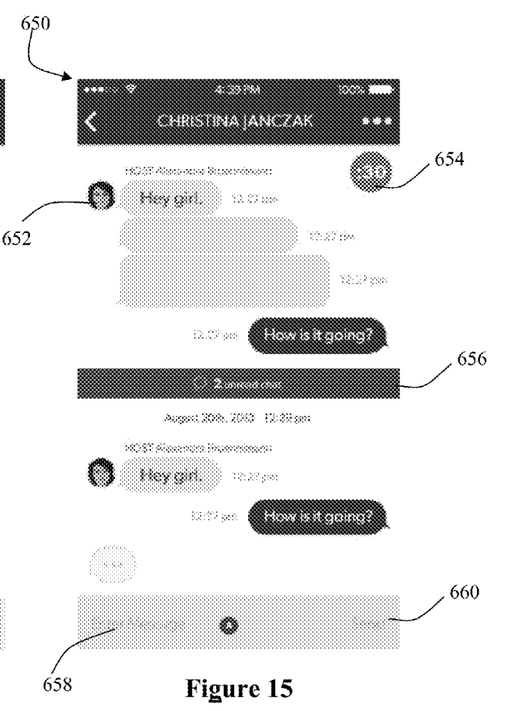
Figure 16:
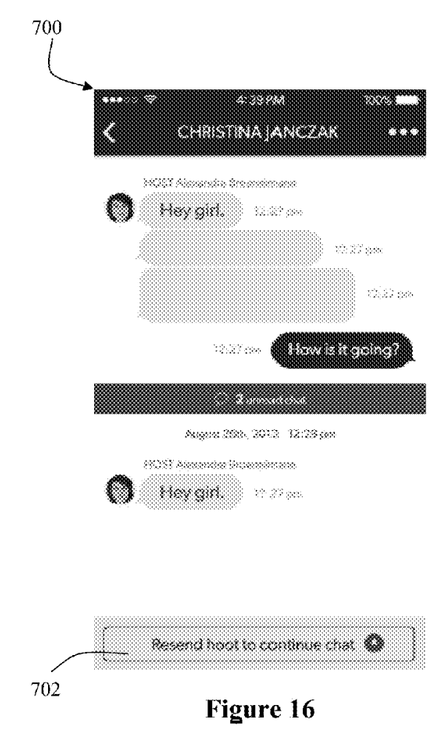

FIG. 15 illustrates an example screenshot of a page 650 showing messages 652 from a chat. As discussed above, in one embodiment users may chat for an hour before the Hoot expires. Once expired, in one embodiment, the messages from a Hoot chat will remain viewable on the device for 30 minutes. In the illustrated embodiment, a 30 minute timer graphic 654 is displayed to indicate that the messages will expire in 30 minutes. Users are able to view the previous messages during this time period. Each user has the ability to resend the Hoot by selecting a "Resend hoot to continue chat" option 702 from the chat page 700 (an example screenshot of the page 700 is illustrated in FIG. 16). In one embodiment, if a Hoot request is sent to the same user within 24 hours, the chat history between the users will appear in the chat tab. After 24 hours without an active Hoot, the chat history will no longer be available. The illustrated page 650 also contains a list 656 of unread messages, and a field 658 for entering text for a message and an option 660 for sending the message. It should be appreciated that in other disclosed embodiments the messages are not deleted.

Figure 17:
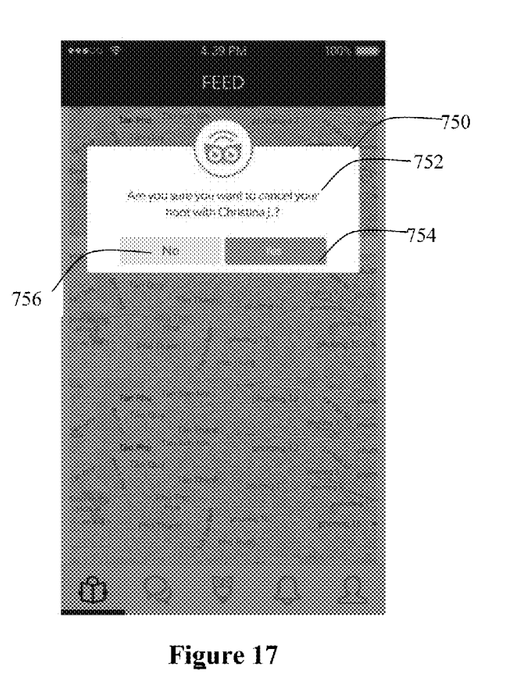

FIG. 17 illustrates the notification 750 that is displayed to a device user when cancelling a Hoot. The notification 750 includes a prompt 752 asking the user to confirm its decision (e.g., "Are you sure you want to cancel your hoot with Christina j.?"). Selecting the "Yes" option 754 cancels the Hoot, while selecting the "No" option 756 does not.

The various embodiments described above have been presented by way of example, and not limitation. It will be apparent to persons skilled in the art(s) that various changes in form and detail can be made therein without departing from the spirit and scope of the disclosure. In fact, after reading the above description, it will be apparent to one skilled in the relevant art(s) how to implement alternative embodiments. Thus, the disclosure should not be limited by any of the above-described exemplary embodiments.

What is claimed is:

1. A method for opt-in and time limited bi-directional location sharing between a first device associated with a first participant and a second device associated with a second participant, said method comprising:
   receiving, at a server, a connection request from a first device to share information between the first and second devices, wherein the shared information includes messages and meta-data;
   providing, from the server, the connection request to the second device, said first and second participants being known to each or known as users in a same group, the information including at least locations of the first and second devices, the request providing the second participant with a choice to accept or deny the connection request;
   if the connection request is accepted, said method further comprises:
      bi-directionally sharing locations of the first and second devices by the server for a first predetermined period of time,
      determining, at the server, if a command to terminate the connection was received by either participant at any time during the first predetermined period of time,
      determining, at the server, if the first and second devices are within a predetermined distance of each other, and
      if it is determined that the first and second devices are within a predetermined distance of each other, allowing the connection to be terminated prior to the end of the first predetermined period of time; and if the connection request is not accepted, caching the connection request at the server and attempting the connection request periodically until the connection is established or a connection request duration time limit is reached at which point the connection request is canceled;

wherein messages exchanged between the first and second devices are deleted from the first and second devices after the connection is terminated and after a second predetermined time period has elapsed; and wherein the messages exchanged between the first and second devices are reloaded onto the first and second devices if the connection is reestablished before a third period of time has elapsed.

2. The method of claim 1, wherein the messages, meta data and locations are encrypted.

3. The method of claim 1, wherein messages exchanged between the first and second devices are stored on the server while the connection is active, but then deleted from the server after the connection is terminated and after a second predetermined time period has elapsed.

4. The method of claim 1, wherein the connection is automatically terminated when the first predetermined time period expires.

5. A method for opt-in and time limited bi-directional location sharing between a group of devices associated with a group of participants, said method comprising:

receiving, at a server, a connection request from a first device from the group of devices to share information between the first device and other devices of the group of devices, wherein the shared information includes messages and meta-data;

providing, from the server, the connection request to the other devices of the group of devices, said participants being known to each other or known as users in a same group, the information including at least locations of the devices, the request providing the participants of the other devices with a choice to accept or deny the connection request;

if the connection request is accepted by any device of the group of devices, said method further comprises:
  bi-directionally sharing locations of the first device and any of the other devices that have accepted the request by the server for a first predetermined period of time,
  determining, at the server, if a command to terminate the connection was received by any participant at any time during the first predetermined period of time,
  determining, at the server, if the first device and any other device that has accepted the request are within a predetermined distance of each other, and
  if it is determined that the first device and a device that has accepted the request are within a predetermined distance of each other, allowing the connection to be terminated at the server based on a command from one of the participants associated with the first device and the device within the predetermined distance prior to the end of the first predetermined period of time; and if the connection request is not accepted, caching the connection request at the server and attempting the connection request periodically until the connection is established or a connection request duration time limit is reached at which point the connection request is canceled;

wherein messages exchanged between the devices are deleted from the devices after the connection is terminated and after a second predetermined time period has elapsed; and wherein the messages exchanged between the devices are reloaded onto the devices if the connection is reestablished before a third period of time has elapsed.

6. The method of claim 5, wherein the messages, meta data and locations are encrypted.

7. The method of claim 5, wherein messages exchanged between the devices are stored on the server while the connection is active, but then deleted from the server after the connection is terminated and after a second predetermined time period has elapsed.

8. The method of claim 5, wherein the connection is automatically terminated when the first predetermined time period expires.

9. A system for opt-in and time limited bi-directional location sharing between a first device associated with a first participant and a second device associated with a second participant, said system comprising:

a server adapted to:
  receive, from the first device, a connection request to share information between the first and second devices, said first and second participants being known to each other or known as users in a group, the information including at least locations of the first and second devices, wherein the shared information includes messages and meta-data;
  transmit the connection request to the second device, the request providing the second participant with a choice to accept or deny the connection request;
  determine if the connection request is accepted by the second device, and if accepted:
    provide bi-directional sharing of locations of the first and second devices for a first predetermined period of time,
    accept a command to terminate the connection by either participant at any time during the first predetermined period of time,
    determine if the first and second devices are within a predetermined distance of each other, and
    if it is determined that the first and second devices are within a predetermined distance of each other, allowing the connection to be terminated by the participants prior to the end of the first predetermined period of time; and
  determine if the connection request is not accepted, if the request is not accepted, cache the connection request and attempt the connection request periodically until the connection is established or a connection request duration time limit is reached at which point the connection request is canceled;

wherein messages exchanged between the first and second devices are deleted from the first and second devices after the connection is terminated and after a second predetermined time period has elapsed; and wherein the messages exchanged between the first and second devices are reloaded onto the first and second devices if the connection is reestablished before a third period of time has elapsed.

10. The system of claim 9, wherein the messages, meta data and locations are encrypted.

11. The system of claim 9, wherein messages exchanged between the first and second devices are stored on the server while the connection is active, but then deleted from the server after the connection is terminated and after a second predetermined time period has elapsed.

12. A first mobile device, said first mobile device executing an application program to perform a method for opt-in and time limited bi-directional location sharing between said first mobile device and a second mobile device, said first mobile device being associated with a first participant, said second mobile device being associated with a second participant, said executing application program causing said first mobile device to:
  receive, from said second mobile device, a connection request to share information with said second mobile device, the first and second participants being known to each other or known as users in a group, the information including at least locations of said first and second mobile devices, the request providing the first participant with a choice to accept or deny the connection request, wherein the shared information includes messages and meta-data;
  input a user response to the request;
  transmit the user response to an external device adapted to create a connection between said first and second mobile devices;
  if the connection request is accepted:
    receive at least a location of said second mobile device for a first predetermined period of time,
    transmit at least a location of said mobile device to said second mobile device for a first predetermined period of time,
    display a map on a display area of said first mobile device,
    generate and display graphical indicators corresponding to the locations of said first and second mobile devices on the map,
    accept a command to terminate the connection by either participant at any time during the first predetermined period of time,
    determine if said first mobile device and said second mobile device are within a predetermined distance of each other, and
    if it is determined that said first and second mobile devices are within a predetermined distance of each other, allowing the connection to be terminated prior to the end of the first predetermined period of time;
  wherein messages exchanged between the first and second mobile devices are deleted from the first and second mobile devices after the connection is terminated and after a second predetermined time period has elapsed; and
  wherein the messages exchanged between the first and second mobile devices are reloaded onto the first and second mobile devices if the connection is reestablished before a third period of time has elapsed.

13. The first mobile device of claim 12, wherein the messages, meta data and locations are encrypted.

14. The first mobile device of claim 12, wherein said mobile device automatically terminates the connection when the first predetermined time period expires.

15. The first mobile device of claim 12, wherein said mobile device receives a command to terminate the connection when the first predetermined time period expires.

* * * * *